United States Patent [19]

Kotera et al.

[11] 4,236,078
[45] Nov. 25, 1980

[54] METHOD AND APPARATUS FOR RECORDING AND REPRODUCING A RADIATION IMAGE

[75] Inventors: Noboru Kotera; Syusaku Eguchi, both of Odawara; Junji Miyahara, Minami-ashigara; Seiji Matsumoto, Minami-ashigara; Hisatoyo Kato, Minami-ashigara, all of Japan

[73] Assignee: Fuji Photo Film Co., Ltd., Minami-ashigara, Japan

[21] Appl. No.: 57,092

[22] Filed: Jul. 12, 1979

[30] Foreign Application Priority Data

Jul. 12, 1978 [JP] Japan .................................. 53-84740
Jul. 12, 1978 [JP] Japan .................................. 53-84743

[51] Int. Cl.$^3$ .................................................. G01F 1/20
[52] U.S. Cl. ............................. 250/363 R; 250/327.1; 250/484
[58] Field of Search .................... 250/327.1, 337, 484, 250/363 R; 252/301.4 R, 301.6 R

[56] References Cited

U.S. PATENT DOCUMENTS

| | | | |
|---|---|---|---|
| 3,188,467 | 6/1965 | Weissenberg | 250/337 |
| 3,207,896 | 9/1965 | Meaney et al. | 250/327.1 |
| 3,453,436 | 7/1969 | Nail | 250/484 |
| 3,859,527 | 1/1975 | Luckey | 250/337 |
| 3,975,637 | 8/1976 | Ikedo et al. | 250/327.1 |

*Primary Examiner*—Davis L. Willis
*Attorney, Agent, or Firm*—Gerald J. Ferguson, Jr.; Joseph J. Baker

[57] ABSTRACT

A radiation image is recorded on a stimulable phosphor, and the recorded image is reproduced by utilizing the stimulability of the phosphor. As the phosphor is used at least one of the following phosphors.

(a) a copper and lead activated zinc sulfide phosphor ZnS:Cu,Pb).
(b) a phosphor included in a group of europium activated barium aluminate phosphors represented by the formula $$BaO.xAl_2O_3:Eu$$

wherein x is a number satisfying the condition of $0.8 \leq x \leq 10$.
(c) a phosphor included in a group of divalent metal silicate phosphors represented by the formula $$M^{II}O.ySiO_2:A$$

wherein $M^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$.
(d) a phosphor included in a group of oxyhalide phosphors represented by the formula $$LnOX:zA'$$

wherein Ln is at least one element selected from the group consisting of La, Y, Gd and Lu, X is Cl and/or Br, A' is Ce and/or Tb, and z is a number satisfying the condition of $0 < z < 0.1$.

22 Claims, 7 Drawing Figures

FIG.1
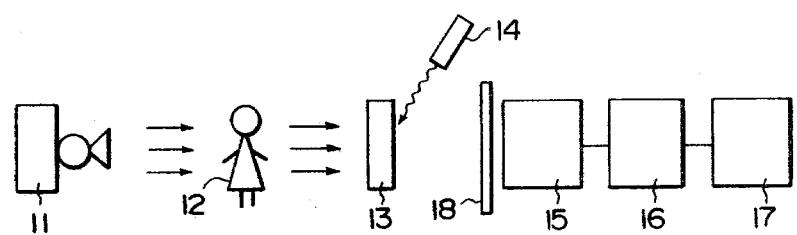
FIG.2A FIG.2B
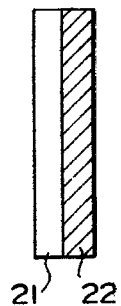 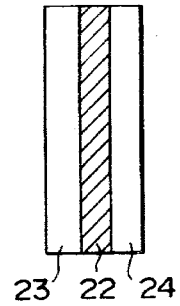

METHOD AND APPARATUS FOR RECORDING AND REPRODUCING A RADIATION IMAGE

BACKGROUND OF THE INVENTION

1. Field of the Invention

This invention relates to a method and an apparatus for recording and reproducing a radiation image, and more particularly to a method and an apparatus for recording a radiation image on a stimulable phosphor and reproducing the recorded radiation image utilizing stimulability of the stimulable phosphor.

2. Description of the Prior Art

As is well known in the art, a photographic film using a silver halide has generally been employed to record a radiation image. Recently, from the viewpoint of problems such as shortage of silver resource, a method for recording a radiation image without using a silver salt has been desired.

As a method which can take the place of the above-mentioned photography, a method for recording and reproducing a radiation image is known, which comprises the steps of (i) causing a stimulable phosphor to absorb a radiation passing through an object, (ii) stimulating the phosphor by a certain kind of energy to release the energy of the radiation stored in the phosphor as fluorescent light, and (iii) detecting the fluorescent light. For example, British Pat. No. 1,462,769 and Japanese Patent Laid Open No. 29,889/1976 disclose a method included in the above-mentioned method, wherein a heat-stimulable phosphor, viz, a thermoluminescent phosphor, and thermal energy are employed as the stimulable phosphor and the stimulation energy, respectively. That is, in the method disclosed in the above publications, a radiation image storage panel comprising a support base and a thermoluminescent phosphor layer provided thereon is employed, and a radiation image is recorded and reproduced by causing the thermoluminescent phosphor layer of the panel to absorb a radiation passing through an object to store therein the energy of the radiation corresponding to the intensity of the radiation, releasing the radiation energy stored as a light signal by heating the thermoluminescent phosphor layer, and then detecting the light signal. However, the kind of the materials employed in the thermoluminescent phosphor layer and the support base of the panel is severely limited, because the panel is heated in order to convert the radiation image stored therein to a light signal, and hence, it is absolutely required for the panel to be heat resistant (resistance to deformation or deterioration by heat). Accordingly, in view of the above limitation, it is considered to be substantially difficult to practically use the method disclosed in the above publications.

U.S. Pat. No. 3,859,527 discloses another method included in the above-mentioned method and an apparatus therefor wherein a visible ray- or infrared ray-stimulable phosphor and visible rays or infrared rays are employed as the stimulable phosphor and the stimulation energy, respectively. The method disclosed in the above U.S. patent is considered to be more preferable than that disclosed in said British patent and said Japanese patent, because the panel employed in the method of the U.S. patent is not heated but exposed to visible rays or infrared rays in order to convert the radiation energy stored therein to a light signal, and accordingly, it is not required for the panel to be heat resistant. However, as a visible ray- or infrared ray-stimulable phosphor which can be employed in the method, only several phosphors such as a cerium and samarium activated strontium sulfide phosphor (SrS:Ce,Sm), a europium and samarium activated strontium sulfide phosphor (SrS:Eu,Sm), a europium and samarium activated lanthanum oxysulfide phosphor ($La_2O_2S$:Eu,Sm) and a manganese and halogen activated zinc cadmium sulfide phosphor [(Zn,Cd)S:Mn,X, wherein X is halogen] are known. Further, the sensitivity in the method in which these phosphors are employed is very low because the stimulability of these phosphors is very low. Accordingly, from the viewpoint of the practical use of the method, the improvement of the sensitivity thereof is desired.

SUMMARY OF THE INVENTION

An object of the present invention is to provide a method for recording and reproducing a radiation image using a visible ray- or infrared ray-stimulable phosphor which performs recording and reproducing thereof with high sensitivity.

Another object of the present invention is to provide an apparatus for carrying out the method of the present invention.

In order to accomplish the above-mentioned objects, the inventors conducted an investigation to search for a visible ray- or infrared ray-stimulable phosphor having high stimulability. As a result of the investigation, it was found that the following four kinds of phosphors exhibited markedly high stimulability under stimulation of visible rays or infrared rays.

(I) A copper and lead activated zinc sulfide phosphor (ZnS:Cu,Pb).

(II) Europium activated barium aluminate phosphors represented by the formula $$BaO.xAl_2O_3:Eu$$

wherein x is a number satisfying the condition of $0.8 \leq x \leq 10$.

(III) Divalent metal silicate phosphors represented by the formula $$M^{II}O.ySiO_2:A$$

wherein $M^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$.

(IV) Oxyhalide phosphors represented by the formula $$LnOX:zA'$$

wherein Ln is at least one element selected from the group consisting of La, Y, Gd and Lu, X is Cl and/or B, A' is Ce and/or Tb, and z is a number satisfying the condition of $0 < z < 0.1$.

Hence, it was found that a method for recording and reproducing a radiation image and an apparatus therefor in which at least one phosphor selected from the group consisting of (a) the ZnS:Cu,Pb phosphor, (b) the phosphor included in the group of $BaO.xAl_2O_3$:Eu phosphors, (c) the phosphor included in the group of $M^{II}O.ySiO_2$:A phosphors, and (d) the phosphor included in the group of LnOX:zA' phosphors
was employed performed recording and reproducing of a radiation image with remarkably high sensitivity.

The method for recording and reproducing a radiation image of the present invention comprises the steps of (i) causing a visible ray- or infrared ray-stimulable phosphor to absorb a radiation passing through an object, (ii) stimulating the phosphor by stimulation rays selected from visible rays and infrared rays to release the energy of the radiation stored therein as fluorescent light, and (iii) detecting the fluorescent light characterized in that the phosphor is at least one phosphor selected from the group consisting of the above-mentioned (a), (b), (c) and (d), and that the wavelength of the stimulation rays is not less than 500 nm.

The apparatus for recording and reproducing a radiation image of the present invention comprises (i) a radiation image storage panel comprising a visible ray- or infrared ray-stimulable phosphor which absorbs a radiation passing through an object, (ii) a light source emitting stimulation rays which stimulate the phosphor to release the energy of the radiation stored therein as fluorescent light, and (iii) a detector for detecting the fluorescent light characterized in that the phosphor is at least one phosphor selected from the group consisting of the above-mentioned (a), (b), (c) and (d), and that the wavelength of the stimulation rays is not less than 500 nm.

BRIEF DESCRIPTION OF THE DRAWINGS

FIG. 1 schematically shows a method and an apparatus for recording and reproducing a radiation image in accordance with an embodiment of the present invention, FIGS. 2A and 2B are cross-sectional views of embodiments of the radiation image storage panel used in the method and apparatus of the present invention.

DETAILED DESCRIPTION OF THE INVENTION

Figure 3A:
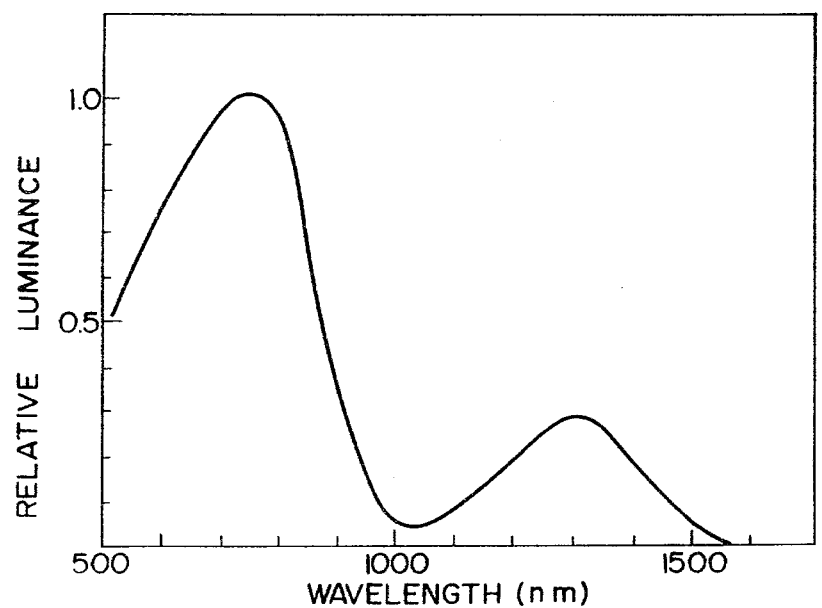
FIGS. 3A and 3B are graphs showing the stimulation spectra of the ZnS:Cu,Pb phosphor and the LaOBr:Ce,Tb phosphor employed in the present invention, respectively.

The present invention will be described in detail hereinbelow.

In an embodiment of the present invention, a radiation source 11, an object 12, a radiation image storage panel 13 having a phosphor layer comprising the above-mentioned phosphor, a light source 14 emitting visible rays having a wavelength of not less than 500 nm or infrared rays which stimulate the phosphor layer to release a radiation energy stored therein as fluorescent light, a photosensor 15 for detecting the fluorescent light emitted from the panel 13, a reproduction device 16 for converting an electrical signal obtained by the photosensor 15 to an image corresponding to the radiation image, a display device 17 for displaying the image, and a filter 18 for cutting the stimulation rays emitted from the light source 14 and reflected by the panel 13 and for transmitting only the fluorescent light emitted from the panel 13 are arranged as shown in FIG. 1. In the embodiment of the present invention shown in FIG. 1, the photosensor 15 is used as a detector for detecting fluorescent light, and reproduction of a radiation image is performed by means of the photosensor 15, the reproduction device 16 and the display device 17. However, means for reproducing a radiation image is not limited thereto.

As shown in FIG. 1, the object 12 is positioned between the radiation source 11 and the radiation image storage panel 13. When the object 12 is exposed to a radiation from the source 11, the radiation passes through the object 12. The intensity of the radiation which has passed through the object 12 represents the transmittance of the object 12. Therefore, an image which represents the pattern of transmittance of the object 12 is obtained by means of the radiation impinging upon the radiation image storage panel 13. The radiation in the form of the image representing the pattern of transmittance of the object 12 is absorbed by the phosphor layer of the panel 13, and electrons or holes are generated in the phosphor layer. The amount of the electrons or holes generated are in proportion to the amount of the radiation energy absorbed. The electrons or holes are stored in the trap level of the phosphor, and thus, the radiation image is stored in the radiation image storage panel 13.

Then, the radiation image stored in the panel 13 is visualized by stimulation with visible rays or infrared rays emitted from the light source 14. That is, the phosphor layer of the panel 13 is exposed to visible rays having a wavelength of not less than 500 nm or infrared rays emitted from the light source 14, whereby the electrons or holes stored in the trap level of the phosphor are expelled therefrom, and the radiation image stored in the panel 13 is released as fluorescent light. The luminance of the fluorescent light emitted from the panel 13 is in proportion to the numbers of the electrons or holes stored in the phosphor layer, that is, the amount of the radiation energy absorbed thereby. The fluorescent light (light signal) is detected and converted to an electrical signal by the photosensor 15 such as a photomultiplier. The electrical signal obtained is converted to an image corresponding to the radiation image by the reproduction device 16, and the image is displayed by the display device 17. Thus, the radiation image is reproduced.

The radiation image storage panel 13 and the light source 14 employed in the apparatus for recording and reproducing a radiation image of the present invention will be described in detail hereinbelow.

As shown in FIG. 2A, the radiation image storage panel comprises a support base 21 and a phosphor layer 22 disposed thereon. The phosphor layer 22 comprises at least one phosphor selected from the group consisting of (a) a copper and lead activated zinc sulfide phosphor (ZnS:Cu,Pb), (b) a phosphor included in a group of europium activated barium aluminate phosphors represented by the formula

$BaO.xAl_2O_3:Eu$ wherein x is a number satisfying the condition of $0.8 \leq x \leq 10$, (c) a phosphor included in a group of divalent metal silicate phosphors represented by the formula

$M^{II}O.ySiO_2:A$ wherein $M^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$, and (d) a phosphor included in a group of oxyhalide phosphors represented by the formula LnOX:zA' wherein Ln is at least one element selected from the group consisting of La, Y, Gd and Lu, X is Cl and/or Br, A' is Ce and/or Tb, and z is a number satisfying the condition of $0 < x < 0.1$.

In the above-mentioned ZnS:Cu, Pb phosphor, $BaO.xAl_2O_3$:Eu phosphors and $M^{II}O.ySiO_2$:A phosphors, the amount of the activator (Cu plus Pb, Eu, and A, respectively) is preferably not larger than 0.2 gram atoms, more preferably within the range of $10^{-6}$ to $5 \times 10^{-3}$ gram atoms per 1 mol of the matrix (ZnS, $BaO.xAl_2O_3$ and $M^{II}O.ySiO_2$, respectively). In the above-mentioned LnOX:zA' phosphors, the amount of the activator (A'), that is, z is preferably within the range of $10^{-6}$ to $10^{-1}$, more preferably within the range of $10^{-6}$ to $5 \times 10^{-3}$. Ln is preferably La.

For example, the radiation image storage panel shown in FIG. 1 is manufactured by the following manufacturing process.

A coating dispersion having a viscosity of 50 centistokes is prepared by mixing 8 parts by weight of the above-mentioned phosphor and 1 part by weight of a nitrocellulose using a solvent (a mixture of acetone, ethyl acetate and butyl acetate). Then, the coating dispersion is uniformly applied to a horizontally placed polyethylene terephthalate film (support base) and dried naturally for one day to form a phosphor layer of about 300μ thick thereon. A transparent glass plate or a metal foil such as an aluminium foil can also be employed as a support base.

A radiation image storage panel having the structure shown in FIG. 2B can also be employed in the method and apparatus of the present invention. The radiation image storage panel of FIG. 2B comprises two transparent support bases 23, 24 and a phosphor layer 22 provided therebetween. Of course, the phosphor layer 22 comprises the above-mentioned phosphor. For example, the radiation image storage panel is manufactured by sandwiching a phosphor layer having a proper thickness between two glass plates, and then sealing the edges of the phosphor layer.

As a light source emitting stimulation rays which stimulates the phosphor layer of the above-mentioned radiation image storage panel, a light source emitting light of a single wavelength such as a He-Ne laser beam (633 nm), a YAG laser beam (1064 nm) and a ruby laser beam (694 nm) can be employed as well as a light source emitting light having a band spectrum within the range of visible rays having a wavelength of not less than 500 nm and infrared rays. In particular, a high stimulation energy can be obtained by employing laser beam. Among laser beams, the He-Ne laser beam is preferable.

Figure 3B:
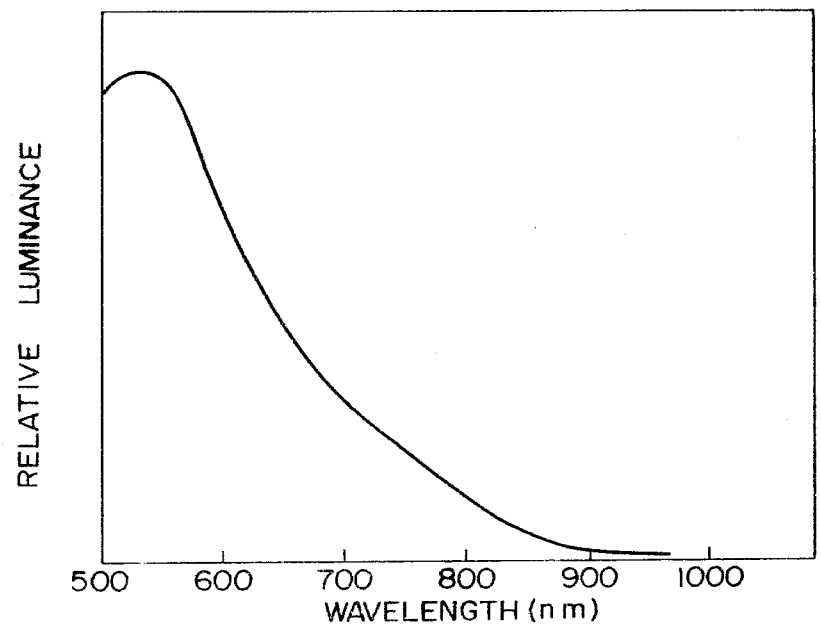

FIGS. 3A and 3B are graphs showing the relationship between the wavelength of the stimulation rays and the luminance of the stimulated light, that is, the stimulation spectra, of the ZnS:Cu,Pb phosphor and the LaOBr:0.0001Ce,0.0001Tb phosphor employed in the present invention, respectively.

The stimulation spectra were obtained by exposing the ZnS:Cu,Pb phosphor and the LaOBr:0.000-1Ce,0.0001Tb phosphor to x-rays of 80 KVp, stimulating the phosphors with visible and infrared rays varying the wavelength thereof, and then measuring the luminance of the stimulated light. As is clear from FIG. 3A, the ZnS:Cu,Pb phosphor can be stimulated with rays having a wavelength within the range of 500 to 1500 nm. The optimum stimulation thereof can be performed within the range of 600 to 950 nm. Further, as is clear from FIG. 3B, the LaOBr:0.0001Ce,0.0001Tb phosphor can be stimulated with rays having a wavelength within the range of 500 to 900 nm. The optimum stimulation thereof can be performed within the range of 500 to 700 nm. Although the wavelength range of the stimulation rays of the LnOX:zA' phosphors varies slightly depending upon the variation in the composition thereof, it is always about from 500 to 900 nm, and the optimum wavelength range thereof is from 500 to 700 nm.

The wavelength ranges of the stimulation rays for the four kinds of phosphors employed in the present invention and the optimum wavelength ranges thereof are shown in Table 1 below.

TABLE 1

| Kind of Phosphor | The Wavelength Range of the Stimulation Rays | The Optimum Wavelength Range of the Stimulation Rays |
|---|---|---|
| ZnS:Cu,Pb | 500 to 1500nm | 600 to 950nm |
| BaO . xAl$_2$O$_3$:Eu | 500 to 1200nm | 650 to 1000nm |
| M$^{II}$O . ySiO$_2$:A | 500 to 1100nm | 500 to 700nm |
| LnOX:zA' | 500 to 900nm | 500 to 700nm |

As shown in FIG. 3B, the stimulation spectra of the LnOX:zA' phosphors have only one peak in the neighbourhood of 540 nm. On the other hand, as illustrated in FIG. 3A, the stimulation spectra of the ZnS:Cu,Pb phosphor, the BaO.xAl$_2$O$_3$:Eu phosphors and the M$^{II}$O.ySiO$_2$:A phosphors have two spectral bands within the wavelength range of 500 to 1500 nm, and the peak of the spectral band of shorter wavelength is higher than that of longer wavelength.

In the method for recording and reproducing a radiation image using a stimulable phosphor, it is desirable to use a visible ray-stimulable phosphor rather than an infrared ray-stimulable phosphor as the stimulable phosphor. Because, the trap of the infrared ray-stimulable phosphor is shallower than that of the visible ray-stimulable phosphor, and accordingly, the radiation image storage panel comprising the infrared ray-stimulable phosphor exhibits remarkable fading, and hence, the radiation image storage period thereof is short. For example, when the panel comprising the infrared ray-stimulable phosphor is scanned with infrared rays, and the fluorescent light emitted therefrom is processed electrically, a certain period of time is required to scan the overall face of the panel, and accordingly, there is the possibility that the difference arises between the initial output and the final output even though the initial portion and the final portion of the panel absorb the same amount of a radiation beforehand.

For the reason described above, in the method for recording and reproducing a radiation image using a stimulable phosphor, it is desirable to use a stimulable phosphor which has as deep a trap as possible and accordingly, is stimulated efficiently by rays having high energy, that is, rays of short wavelength. As described hereinbefore, the optimum stimulation rays of the M$^{II}$O.ySiO$_2$:A phosphors and the LnOX:zA' phosphors employed in the present invention are visible rays having a wavelength within the range of 500 to 700 nm, and the optimum stimulation rays of the ZnS:Cu,Pb phosphor and the BaO.xAl$_2$O$_3$:Eu phosphors employed in the present invention are within a range including visible rays. Accordingly, the radiation image storage panel used in the method and apparatus of the present invention exhibits little fading and has high preservability.

Figure 4:
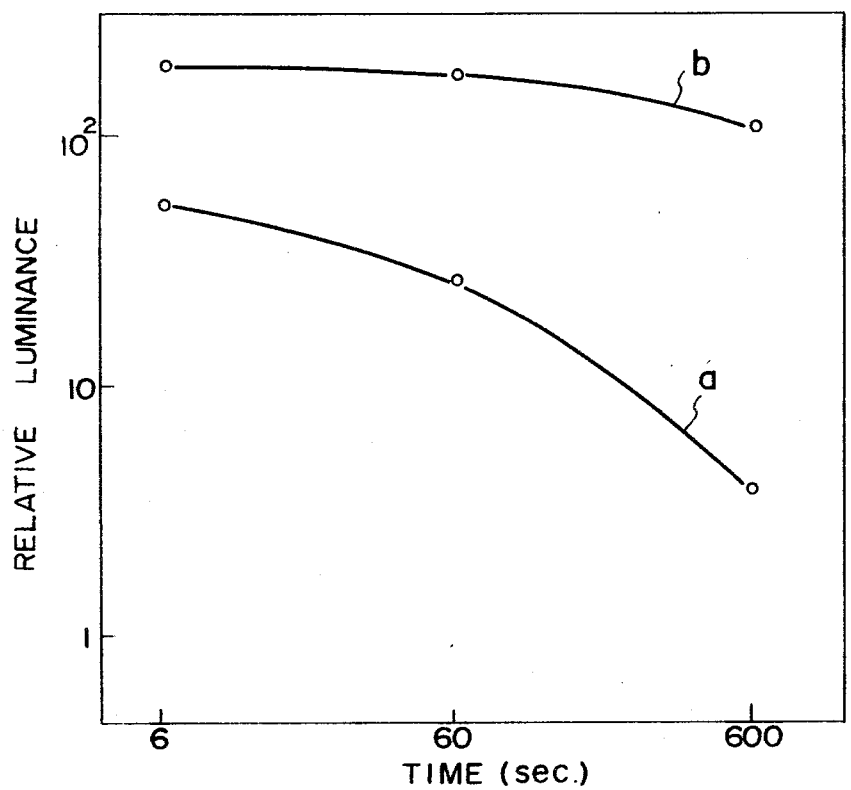
FIG. 4 is a graph showing the fading of the ZnS:Cu,Pb phosphor stored with radiation energy.

FIG. 4 is a graph showing the relationship between the period of time during which the ZnS:Cu,Pb phosphor was allowed to stand after exposure to x-rays of 80 KVp and the relative luminance of the stimulated light emitted from the phosphor when stimulated with stimulation rays after the phosphor was allowed to stand for said period of time, wherein curves a and b show the cases in which the phosphor was stimulated with rays of 1300 nm and rays of 750 nm, respectively. As is clear from FIG. 4, in the case of the stimulation with rays of 1300 nm (curve a), the phosphor exhibits markedly higher fading in comparison with the case of the stimulation with rays of 750 nm (curve b).

Further, in the method for recording and reproducing a radiation image using a stimulable phosphor, it is desirable to use a stimulable phosphor which emits stimulated light of as short a wavelength as possible. The reasons thereof are as follows.

(i) In detecting the stimulated light emitted from the panel, it is necessary to separate the stimulated light from the stimulation rays reflected by the panel.

(ii) The photosensor for detecting the stimulated light emitted from the panel generally has high sensitivity to rays having a wavelength of shorter than 600 nm.

Figure 5:
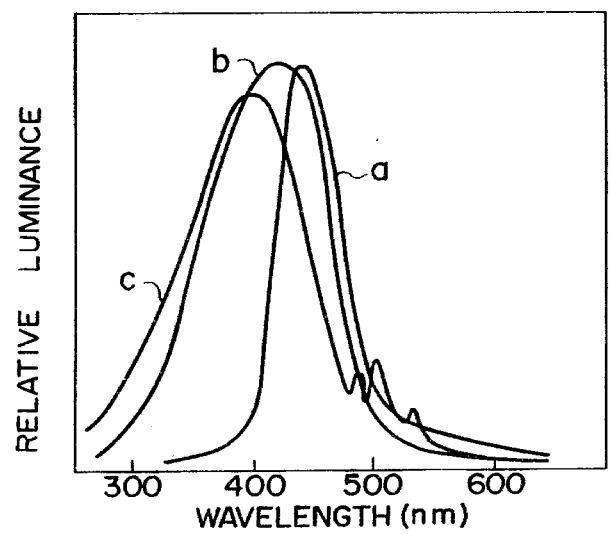
FIG. 5 is a graph showing the stimulated emission spectra of the stimulable phosphors employed in the present invention.

The four kinds of phosphors employed in the present invention satisfy the above condition. That is, each of these phosphors exhibits a stimulated emission having a main peak in the wavelength region shorter than 500 nm. Accordingly, the stimulated light emitted therefrom can easily be separated from the stimulation rays. Further, the spectrum of the stimulated light is in good agreement with the spectral sensitivity of the photosensor and therefore, can be detected efficiently by the photosensor. The stimulated emission spectra of the BaO.6Al$_2$O$_3$:Eu$^{2+}$ phosphor, the BaO.SiO$_2$:Ce phosphor and the LaOBr:Ce,Tb phosphor measured by stimulating these phosphors with a He-Ne laser beam after exposure to x-rays of 80 KVp are illustrated in FIG. 5, wherein curves a, b and c show the spectra of the BaO.6Al$_2$O$_3$:Eu$^{2+}$ phosphor (having a peak at about 435 nm), the BaO.SiO$_2$:Ce phosphor (about 425 nm) and the LaOBr:Ce,Tb phosphor (about 400 nm), respectively.

Table 2 below shows the sensitivity of the radiation image storage panel used in the method and apparatus of the present invention (No. 2–No. 8) in comparison with that of the conventional radiation image storage panel employing SrS:Eu,Sm phosphor (No. 1). The sensitivity is represented by the relative luminance of the stimulated light emitted from the panel with reference to that of the stimulated light emitted from the conventional panel which is defined to be 1. The luminance was measured by exposing the phosphor layer of the panel to x-rays of 80 KVp, stimulating the phosphor layer with a He-Ne laser beam, and detecting the fluorescent light (stimulated light) emitted from the phosphor layer by a photosensor (a photomultiplier having a spectral sensitivity of S-5).

TABLE 2

| No. | Phosphor of the Panel | Relative Sensitivity |
|---|---|---|
| 1 | SrS:0.0001Eu,0.0001Sm | 1 |

TABLE 2-continued

| No. | Phosphor of the Panel | Relative Sensitivity |
|---|---|---|
| 2 | ZnS:0.0001Cu,0.0001Pb | 700 |
| 3 | BaO . Al$_2$O$_3$:0.005Eu | 150 |
| 4 | BaO . SiO$_2$:0.0001Ce | 300 |
| 5 | LaOBr:0.001Tb | 700 |
| 6 | LaOBr:0.0005Ce | 500 |
| 7 | LaOBr:0.0001Ce,0.0001Tb | 700 |
| 8 | LaOCl:0.0001Ce,0.0001Tb | 300 |

As is clear from Table 2, the radiation image storage panels used in the method and apparatus of the present invention (No. 2–No. 8) have a markedly high sensitivity than the conventional radiation image storage panel (No. 1). Therefore, the method and apparatus of the present invention perform recording and reproducing of a radiation image with remarkably higher sensitivity than the conventional method and apparatus.

We claim:

1. A method for recording and reproducing a radiation image comprising the steps of (i) causing a visible ray- or infrared ray-stimulable phosphor to absorb a radiation passing through an object, (ii) stimulating said phosphor with stimulation rays selected from visible rays and infrared rays to release the energy of the radiation stored therein as fluorescent light, and (iii) detecting said fluorescent light characterized in that said phosphor is at least one phosphor selected from the group consisting of (a) a copper and lead activated zinc sulfide phosphor (ZnS:Cu,Pb), (b) a phosphor included in a group of europium activated barium aluminate phosphors represented by the formula

BaO.xAl$_2$O$_3$:Eu wherein x is a number satisfying the condition of $0.8 \leq x \leq 10$, (c) a phosphor included in a group of divalent metal silicate phosphors represented by the formula

M$^{II}$O.ySiO$_2$:A wherein M$^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$, and (d) a phosphor included in a group of oxyhalide phosphors represented by the formula

LnOX:zA' wherein Ln is at least one element selected from the group consisting of La, Y, Gd and Lu, X is Cl and/or Br, A' is Ce and/or Tb, and z is a number satisfying the condition of $0 < z < 0.1$, and that the wavelength of said stimulation rays is not less than 500 nm.

2. A method as defined in claim 1 wherein said stimulation rays is a laser beam.

3. A method as defined in claim 2 wherein said laser beam is a He-Ne laser beam.

4. A method as defined in claim 1 wherein said phosphor is said copper and lead activated zinc sulfide phosphor, and the wavelength of said stimulation rays is not more than 1500 nm.

5. A method as defined in claim 4 wherein the wavelength of said stimulation rays is within the range of 600 to 950 nm.

6. A method as defined in claim 1 wherein said phosphor is at least one phosphor selected from said group of europium activated barium aluminate phosphors, and the wavelength of said stimulation rays is not more than 1200 nm.

7. A method as defined in claim 6 wherein the wavelength of said stimulation rays is within the range of 650 to 1000 nm.

8. A method as defined in claim 1 wherein said phosphor is at least one phosphor selected from said group of divalent metal silicate phosphor, and the wavelength of said stimulation rays is not more than 1100 nm.

9. A method as defined in claim 8 wherein the wavelength of said stimulation rays is within the range of 500 to 700 nm.

10. A method as defined in claim 1 wherein said phosphor is at least one phosphor selected from said group of oxyhalide phosphors, and the wavelength of said stimulation rays is not more than 900 nm.

11. A method as defined in claim 10 wherein the wavelength of said stimulation rays is within the range of 500 to 700 nm.

12. An apparatus for recording and reproducing a radiation image comprising (i) a radiation image storage panel comprising a visible ray- or infrared ray-stimulable phosphor which absorbs a radiation passing through an object, (ii) a light source emitting stimulation rays which stimulate said phosphor to release the energy of the radiation stored therein as fluorescent light, and (iii) a detector for detecting said fluorescent light characterized in that said phosphor is at least one phosphor selected from the group consisting of (a) a copper and lead activated zinc sulfide phosphor (ZnS:Cu,Pb), (b) a phosphor included in a group of europium activated barium aluminate phosphors represented by the formula $BaO.xAl_2O_3:Eu$ wherein x is a number satisfying the condition of $0.8 \leq x \leq 10$, (c) a phosphor included in a group of divalent metal silicate phosphors represented by the formula $M^{II}O.ySiO_2:A$ wherein $M^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$, and (d) a phosphor included in a group of oxyhalide phosphors represented by the formula $LnOX:zA'$ wherein Ln is at least one element selected from the group consisting of La, Y, Gd and Lu, X is Cl and/or Br, A' is Ce and/or Tb, and z is a number satisfying the condition of $0 < z < 0.1$, and that the wavelength of said stimulation rays is not less than 500 nm.

13. An apparatus as defined in claim 12 wherein said stimulation rays is a laser beam.

14. An apparatus as defined in claim 13 wherein said laser beam is a He-Ne laser beam.

15. An apparatus as defined in claim 12 wherein said phosphor is said copper and lead activated zinc sulfide phosphor, and the wavelength of said stimulation rays is not more than 1500 nm.

16. An apparatus as defined in claim 15 wherein the wavelength of said stimulation rays is within the range of 600 to 950 nm.

17. An apparatus as defined in claim 12 wherein said phosphor is at least one phosphor selected from said group of europium activated barium aluminate phosphors, and the wavelength of said stimulation rays is not more than 1200 nm.

18. An apparatus as defined in claim 17 wherein the wavelength of said stimulation rays is within the range of 650 to 1000 nm.

19. An apparatus as defined in claim 12 wherein said phosphor is at least one phosphor selected from said group of divalent metal silicate phosphors, and the wavelength of said stimulation rays is not more than 1100 nm.

20. An apparatus as defined in claim 19 wherein the wavelength of said stimulation rays is within the range of 500 to 700 nm.

21. An apparatus as defined in claim 12 wherein said phosphor is at least one phosphor selected from said group of oxyhalide phosphors, and the wavelength of said stimulation rays is not more than 900 nm.

22. An apparatus as defined in claim 21 wherein the wavelength of said stimulation rays is within the range of 500 to 700 nm.

* * * * *

REEXAMINATION CERTIFICATE (978th)

United States Patent [19]

Kotera et al.

[11] B1 4,236,078

[45] Certificate Issued    Jan. 3, 1989

[54] METHOD AND APPARATUS FOR RECORDING AND REPRODUCING A RADIATION IMAGE

[75] Inventors: Noboru Kotera; Syusaku Eguchi, both of Odawara; Junji Miyahara, Minami-ashigara; Seiji Matsumoto, Minami-ashigara; Hisatoyo Kato, Minami-ashigara, all of Japan

[73] Assignee: Fuji Photo Film Co., Ltd., Minami-ashigara, Japan

Reexamination Request:
No. 90/001,117, Oct. 16, 1986

Reexamination Certificate for:
Patent No.: 4,236,078
Issued: Nov. 25, 1980
Appl. No.: 57,092
Filed: Jul. 12, 1979

[30] Foreign Application Priority Data

Jul. 12, 1978 [JP] Japan .................................. 53-84740
Jul. 12, 1978 [JP] Japan .................................. 53-84743

[51] Int. Cl.$^4$ .......................... G01F 1/20; G01N 23/04
[52] U.S. Cl. ............................. 250/363 R; 250/327.2; 250/484.1
[58] Field of Search .................. 250/327.2, 484.1, 337, 250/363 R; 252/301.4 H, 301.4 F, 301.4 R

[56] References Cited

U.S. PATENT DOCUMENTS

| | | | |
|---|---|---|---|
| 2,447,322 | 8/1948 | Fonda | 252/301.6 S |
| 2,523,306 | 9/1950 | Kaiser et al. | 250/316.1 |
| 2,539,196 | 1/1951 | Marshall | 378/75 |
| 2,569,939 | 10/1951 | Lyon | 252/301.4 R |
| 2,569,940 | 10/1951 | Lyon | 252/301.4 F |
| 2,570,136 | 10/1951 | Lyon | 252/301.4 F |
| 3,595,802 | 7/1971 | Blasse | 252/301.4 R |
| 3,617,743 | 11/1971 | Rabatin et al. | 250/213 VT |
| 3,769,510 | 10/1973 | Kotera et al. | 250/459.1 |
| 3,872,309 | 3/1975 | DeBelder et al. | 250/483.1 |
| 3,897,359 | 7/1975 | Kobayashi et al. | 252/301.4 F |
| 3,975,637 | 8/1976 | Ikedo et al. | 250/327.2 |
| 3,996,472 | 12/1976 | Rabatin | 250/484.1 |
| 4,507,562 | 3/1985 | Gasiot et al. | 250/484.1 |

OTHER PUBLICATIONS

O. E. Berg and H. F. Kaiser, "The X-Ray Storage Properties of the Infra-Red Storage Phosphor and Application to Radiography" *Journal of Applied Physics*, vol. 18, (Apr. 1947) pp. 343-347.

*Primary Examiner*—Craig E. Church

[57] ABSTRACT

A radiation image is recorded on a stimulable phosphor, and the recorded image is reproduced by utilizing the stimulability of the phosphor. As the phosphor is used at least one of the following phosphors.

[(a) a copper and lead activated zinc sulfide phosphor ZnS:Cu,Pb).]

[(b)] (a) a phosphor included in a group of europium activated barium aluminate phosphors represented by the formula $$BaO.xAl_2O_3:Eu$$

wherein x is a number satisfying the condition of $0.8 \leq x \leq 10$.

[(c) a phosphor included in a group of divalent metal silicate phosphors represented by the formula $M^{II}O.ySiO_2:A$ wherein $M^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$.]

[(d)] (b) a phosphor included in a group of oxyhalide phosphors represented by the formula $$LnOX:zA'$$

wherein Ln is at least one element selected from the group consisting of La, Y, Gd and Lu, X is Cl and/or Br, A' is Ce and/or Tb, and z is a number satisfying the condition of $0 < z < 0.1$.

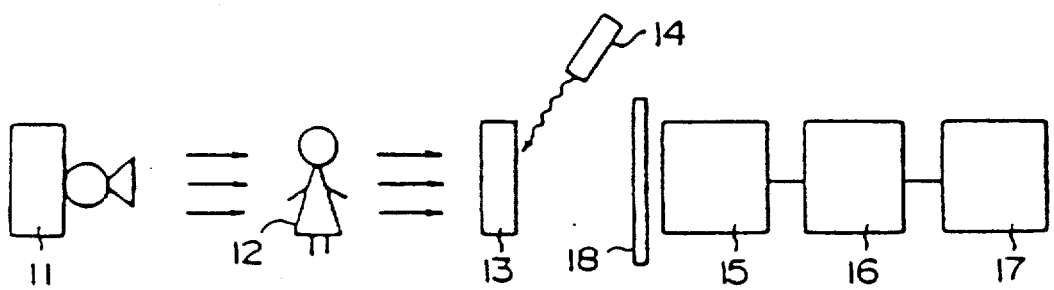

FIG.1
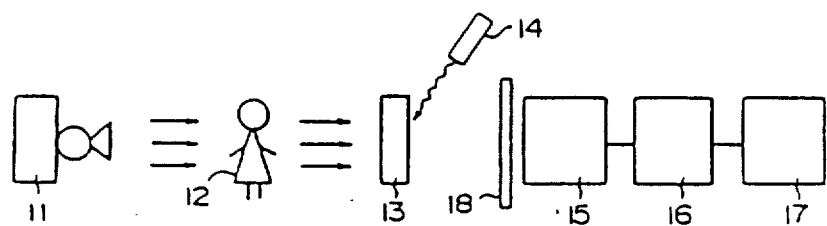
FIG.2A  FIG.2B
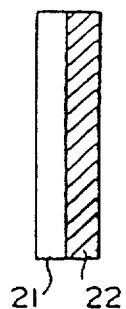  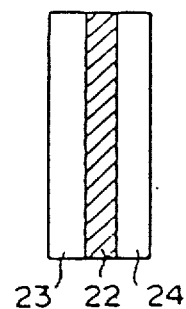

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

The drawing figure(s) have been changed as follows: FIG. 3A is cancelled; FIG. 3B is renumbered FIG. 3; FIG. 4 is cancelled; FIG. 5 is renumbered FIG. 4.

Column 2, lines 25-31:

In order to accomplish the above-mentioned objects, the inventors conducted an investigation to search for a visible ray- or infrared ray-stimulable phosphor having high stimulability. As a result of the investigation, it was found that the following [four] *two* kinds of phosphors exhibited markedly high stimulability under stimulation of visible rays or infrared rays.

Column 2, lines 32-33:

[(I) A copper and lead activated zinc sulfide phosphor (ZnS:Cu,Pb).]

Column 2, lines 34-40:

[(II)] *(I)* Europium activated barium aluminate phosphors represented by the formula $$BaO \cdot xAl_2O_3 : Eu$$

wherein x is a number satisfying the condition of $0.8 \leq x \leq 10$.

Column 2, lines 41-50:

[(III) Divalent metal silicate phosphors represented by the formula $$M^{II}O \cdot ySiO_2 : A$$

wherein $M^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$.]

Column 2, lines 51-59:

[(IV)] *(II)* Oxyhalide phosphors represented by the formula $$LnOX : zA'$$

wherein Ln is at least one element selected from the group consisting of La, Y, Gd and Lu, X is Cl and/or B, A' is Ce and/or Tb, and z is a number satisfying the condition of $0 < z < 0.1$.

Column 2, line 60, through column 3, line 4:

Hence, it was found that a method for recording and reproducing a radiation image and an apparatus therefor in which at least one phosphor selected from the group consisting of

[(a) the ZnS:Cu,Pb phosphor,]

[(b)] (a) the phosphor included in the group of $BaO \cdot xAl_2O_3 : Eu$ phosphors,

[(c) the phosphor included in the group of $M^{II}O \cdot ySiO_2 : A$ phosphors,] and

[(d)] (b) the phosphor included in the group of LnOX:zA' phosphors was employed performed recording and reproducing of a radiation image with remarkably high sensitivity.

Column 3, lines 5-16:

The method for recording and reproducing a radiation image of the present invention comprises the steps of (i) causing a visible ray- or infrared ray-stimulable phosphor to absorb a radiation passing through an object, (ii) stimulating the phosphor by stimulation rays selected from visible rays and infrared rays to release the energy of the radiation stored therein as fluorescent light, and (iii) detecting the fluorescent light characterized in that the phosphor is at least one phosphor selected from the group consisting of the above-mentioned [(a), (b), (c) and (d)] *(a) and (b)*, and that the wavelength of the stimulation rays is not less than 500 nm.

Column 3, lines 17-29:

The apparatus for recording and reproducing a radiation image of the present invention comprises (i) a radiation image storage panel comprising a visible ray- or infrared ray-stimulable phosphor which absorbs a radiation passing through an object, (ii) a light source emitting stimulation rays which stimulate the phosphor to release the energy of the radiation stored therein as fluorescent light, and (iii) a detector for detecting the fluorescent light characterized in that the phosphor is at least one phosphor selected from the group consisting of the above-mentioned [(a), (b), (c) and (d)] *(a) and (b)*, and that the wavelength of the stimulation rays is not less than 500 nm.

Figure 3:
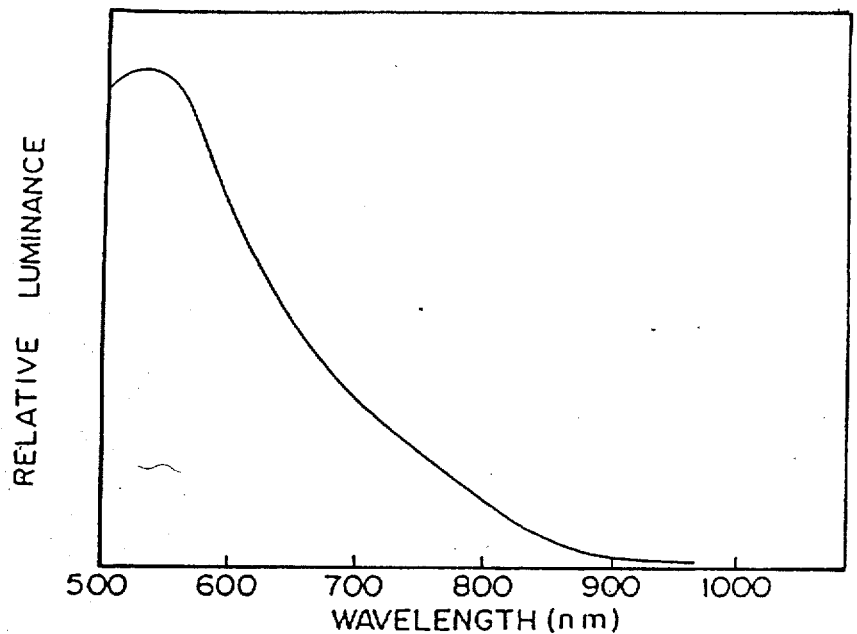
Figure 4:
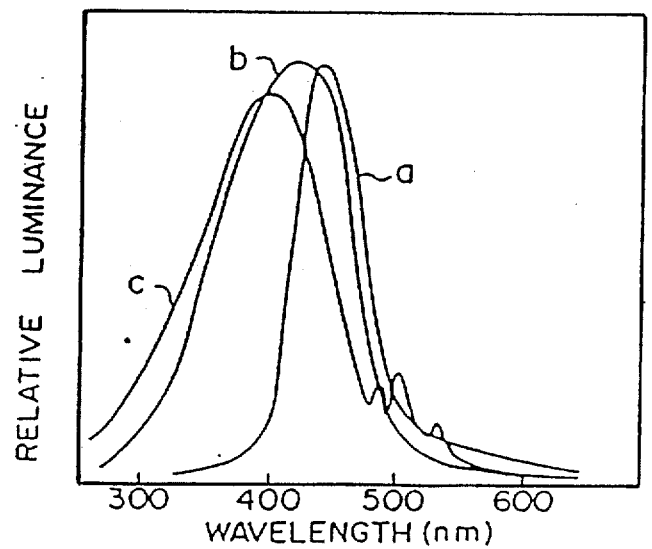

Column 3, lines 39-42:

[FIGS. 3A and 3B are graphs] *FIG. 3 is a graph* showing the stimulation spectra of the [ZnS:Cu,Pb phosphor and the] LaOBr:Ce,Tb phosphor employed in the present invention, [respectively,] *and*

Column 3, lines 43-44:

[FIG. 4 is a graph showing the fading of the ZnS:Cu,Pb phosphor stored with radiation energy, and]

Column 3, lines 45-47:

FIG. [5] *4* is a graph showing the stimulated emission spectra of the stimulable phosphors employed in the present invention.

Column 4, line 51 through column 5, line 14:

As shown in FIG. 2A, the radiation image storage panel comprises a support base 21 and a phosphor layer 22 disposed thereon. The phosphor layer 22 comprises at least one phosphor selected from the group consisting of

[(a) a copper and lead activated zinc sulfide phosphor (ZnS:Cu,Pb),]

[(b)] (a) a phosphor included in a group of europium activated barium aluminate phosphors represented by the formula $$BaO \cdot xAl_2O_3 : Eu$$

wherein x is a number satisfying the condition of $0.8 \leq x \leq 10$,

[(c) a phosphor included in a group of divalent metal silicate phosphors represented by the formula $$M^{II}O \cdot ySiO_2:A$$

wherein $M^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$,] and

[(d)] (b) a phosphor included in a group of oxyhalide phosphors represented by the formula $$LnOX:zA'$$

wherein Ln is at least one element selected from the group consisting of La, Y, Gd and Lu, X is Cl and/or Br, A' is Ce and/or Tb, and z is a number satisfying the condition of $0 < x < 0.1$.

Column 5, lines 15–25:

In the above-mentioned [ZnS:Cu, Pb phosphor,] BaO·xAl$_2$O$_3$:Eu phosphors [and M$^{II}$O·ySiO$_2$:A phosphors], the amount of the activator [(Cu plus Pb,]Eu [, and A, respectively)] is preferably not larger than 0.2 gram atoms, more preferably within the range of $10^{-6}$ to $5 \times 10^{-3}$ gram atoms per 1 mol of the matrix [(ZnS,] BaO·xAl$_2$O$_3$ [and M$^{II}$O·ySiO$_2$, respectively)]. In the above-mentioned LnOX:zA' phosphors, the amount of the activator (A'), that is, z is preferably within the range of $10^{-6}$ to $10^{-1}$, more preferably within the range of $10^{-6}$ to $5 \times 10^{-3}$. Ln is preferably La.

Column 5, lines 62–67:

[FIGS. 3A and 3B are graphs] *FIG. 3 is a graph showing the relationship between the wavelength of the stimulation rays and the luminance of the stimulated light, that is, the stimulation spectra, of the* [ZnS:Cu,Pb phosphor and the] LaOBr:0.0001Ce,0.0001Tb phosphor employed in the present invention[, respectively].

Column 5, lines 68 through column 6, line 17:

The stimulation spectra were obtained by exposing the [ZnS:Cu,Pb phosphor and the] LaOBr:0.0001Ce, 0.0001Tb phosphor to x-rays of 80 KVp, stimulating the phosphors with visible and infrared rays varying the wavelength thereof, and then measuring the luminance of the stimulated light. As is clear from FIG. 3[A, the ZnS:Cu,Pb phosphor can be stimulated with rays having a wavelength within the range of 500 to 1500 nm. The optimum stimulation thereof can be performed within the range of 600 to 950 nm. Further, as is clear from FIG. 3B], the LaOBr:0.001Ce,0.001Tb phosphor can be stimulated with rays having a wavelength within the range of 500 to 900 nm. The optimum stimulation thereof can be performed within the range of 500 to 700 nm. Although the wavelength range of the stimulation rays of the LnOX:zA' phosphors varies slightly depending upon the variation in the composition thereof, it is always about from 500 to 900 nm, and the optimum wavelength range thereof is from 500 to 700 nm.

Column 6, lines 18–21:

The wavelength ranges of the stimulation rays for the [four] *two* kinds of phosphors employed in the present invention and the optimum wavelength ranges thereof are shown in Table 1 below.

Column 6, lines 22–30:

TABLE 1

| Kind of Phosphor | The Wavelength Range of the Stimulation Rays | The Optimum Wavelength Range of the Stimulation Rays |
| --- | --- | --- |
| [ZnS:Cu,Pb | 500 to 1500 nm | 600 to 950 nm] |
| BaO·xAl$_2$O$_3$:Eu | 500 to 1200 nm | 650 to 1000 nm |
| [M$^{II}$O·ySiO$_2$:A | 500 to 1100 nm | 500 to 700 nm] |
| LnOX:zA' | 500 to 900 nm | 500 to 700 nm |

Column 6, lines 32–40:

As shown in FIG. 3[B], the stimulation spectra of the LnOX:zA' phosphors have only one peak in the neighbourhood of 540 nm. On the other hand, [as illustrated in FIG. 3A,] the stimulation spectra of the [ZnS:Cu,Pb phosphor, the] BaO·xAl$_2$O$_3$:Eu phosphors [and the M$^{II}$O·ySiO$_2$:A phosphors] have two spectral bands within the wavelength range of 500 to 1500 nm, and the peak of the spectral band of shorter wavelength is higher than that of longer wavelength.

Column 6, line 60 through column 7, line 7:

For the reason described above, in the method for recording and reproducing a radiation image using a stimulable phosphor, it is desirable to use a stimulable phosphor which has as deep a trap as possible and accordingly, is stimulated efficiently by rays having high energy, that is, rays of short wavelength. As described hereinbefore, the optimum stimulation rays of the [M$^{II}$-O·ySiO$_2$:A phosphors and the] LnOX:zA' employed in the present invention are visible rays having a wavelength within the range of 500 to 700 nm, and the optimum stimulation rays of the [ZnS:Cu,Pb phosphor and the] BaO·xAl$_2$O$_3$:Eu phosphors employed in the present invention are within a range including visible rays. Accordingly, the radiation image storage panel used in the method and apparatus of the present invention exhibits little fading and has high preservability.

Column 7, lines 8–20:

[FIG. 4 is a graph showing the relationship between the period of time during which the ZnS:Cu,Pb phosphor was allowed to stand after exposure to x-rays of 80 KVp and the relative luminance of the stimulated light emitted from the phosphor when stimulated with stimulation rays after the phosphor was allowed to stand for said period of time, wherein curves a and b show the cases in which the phosphor was stimulated with rays of 1300 nm and rays of 750 nm, respectively. As is clear from FIG. 4, in the case of the stimulation with rays of 1300 nm (curve a), the phosphor exhibits markedly higher fading in comparison with the case of the stimulation with rays of 750 nm (curve b).]

Column 7, lines 32–49:

The [four] *two* kinds of phosphors employed in the present invention satisfy the above condition. That is, each of these phosphors exhibits a stimulated emission having a main peak in the wavelength region shorter than 500 nm. Accordingly, the stimulated light emitted therefrom can easily be separated from the stimulation rays. Further, the spectrum of the stimulated light is in good agreement with the spectral sensitivity of the photosensor and therefore, can be detected efficiently by the photosensor. The stimulated emission spectra of the $BaO\cdot6Al_2O_3:Eu^{2+}$ phosphor, the $BaO\cdot SiO_2:Ce$ phosphor and the LaOBr:Ce, Tb phosphor measured by stimulating these phosphors with a He-Ne laser beam after exposure to x-rays of 80 KVp are illustrated in FIG. [5] 4, wherein curves a, b and c show the spectra of the $BaO\cdot6Al_2O_3:Eu^{2+}$ phosphor (having a peak at about 435 nm), the $BaO\cdot SiO_2:Ce$ phosphor (about 425 nm) and the LaOBr:Ce,Tb phosphor (about 400 nm), respectively.

Column 7, line 65 through column 8, line 9:

TABLE 2

| No. | Phosphor of the Panel | Relative Sensitivity |
|---|---|---|
| 1 | SrS:0.0001Eu,0.0001Sm | 1 |
| [2 | ZnS:0.0001Cu,0.0001Pb | 700] |
| [3] 2 | BaO.Al₂O₃:0.005Eu | 150 |
| [4] 3 | BaO.SiO₂:0.0001Ce | 300 |
| [5] 4 | LaOBr:0.001Tb | 700 |
| [6] 5 | LaOBr:0.0005Ce | 500 |
| [7] 6 | LaOBr:0.0001Ce,0.0001Tb | 700 |
| [8] 7 | LaOCl:0.0001Ce,0.0001Tb | 300 |

AS A RESULT OF REEXAMINATION, IT HAS BEEN DETERMINED THAT:

Claims 4, 5, 8, 9, 15, 16, 19 and 20 are cancelled.

Claims 1 and 12 are determined to be patentable as amended.

Claims 2, 3, 6, 7, 10, 11, 13, 14, 17, 18, 21 and 22, dependent on an amended claim, is determined to be patentable.

New claims 23–46 are added and determined to be patentable.

1. A method for recording and reproducing a radiation image comprising the steps of (i) causing a visible ray- or infrared ray-stimulable phosphor to absorb a radiation passing through an object, (ii) stimulating said phosphor with stimulation rays selected from visible rays [and infrared rays] to release the energy of the radiation stored therein as fluorescent light, and (iii) detecting said fluorescent light characterized in that said phosphor is at least one phosphor selected from the group consisting of
   [(a) a copper and lead activated zinc sulfide phosphor (ZnS:Cu,Pb),
   (b)] (a) a phosphor included in a group of europium activated barium aluminate phosphors represented by the formula $BaO \cdot xAl_2O_3:Eu$ wherein x is a number satisfying the condition of $0.8 \leq x \leq 10$,
   [(c) a phosphor included in a group of divalent metal silicate phosphors represented by the formula $M^{II}O \cdot ySiO_2:A$ wherein $M^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$,] and
   [(d)] (b) a phosphor included in a group of oxyhalide phosphors represented by the formula $LnOX:zA'$ wherein Ln is at least one element selected from the group consisting of La, Y, Gd and Lu, X is Cl and/or Br, A' is Ce and/or Tb, and z is a number satisfying the condition of $0 < z < 0.1$, and that the wavelength of said stimulation rays is not less than 500 nm.

12. An apparatus for recording and reproducing a radiation image comprising (i) a radiation image storage panel comprising a visible ray- or infrared ray-stimulable phosphor which absorbs a radiation passing through an object, (ii) a light source emitting *visible* stimulation rays which stimulate said phosphor to release the energy of the radiation stored therein as fluorescent light, and (iii) a detector for detecting said fluorescent light characterized in that said phosphor is at least one phosphor selected from the group consisting of
   [(a) a copper and lead activated zinc sulfide phosphor (ZnS:Cu,Pb),
   (b)] (a) a phosphor included in a group of europium activated barium aluminate phosphors represented by the formula $BaO \cdot xAl_2O_3:Eu$ wherein x is a number satisfying the condition of $0.8 \leq x \leq 10$,
   [(c) a phosphor included in a group of divalent metal silicate phosphors represented by the formula $M^{II}O \cdot ySiO_2:A$ wherein $M^{II}$ is at least one divalent metal selected from the group consisting of Mg, Ca, Sr, Zn and Ba, A is at least one element selected from the group consisting of Ce, Tb, Eu, Tm, Pb, Tl, Bi and Mn, and y is a number satisfying the condition of $0.5 \leq y \leq 2.5$,] and
   [(d)] (b) a phosphor included in a group of oxyhalide phosphors represented by the formula $LnOX:zA'$ wherein Ln is at least one element selected from the group consisting of La, Y, Gd and Lu, X is Cl and/or Br, A' is Ce and/or Tb, and z is a number satisfying the condition of $0 < z < 0.1$, and that the wavelength of said stimulation rays is not less than 500 nm.

23. A method as defined in claim 1 wherein said phosphor is not heated by said visible rays.

24. A method as defined in claim 1 wherein said phosphor is no heated by said stimulation rays.

25. An apparatus as in claim 12 wherein said phosphor is not heated by said visible rays.

26. An apparatus as defined in claim 12 wherein phosphor is not heated by said stimulation rays.

27. A method as defined in claim 1 wherein said phosphor is included in said group of oxyhalide phosphors.

28. A method as defined in claim 1 wherein said phosphor is included in said group of europium activated barium aluminate phosphors.

29. Apparatus as defined in claim 12 wherein said phosphor is included in said group of oxyhalide phosphors.

30. Apparatus as defined in claim 12 wherein said phosphor is included in said group of europium activated barium aluminate phosphors.

31. A method as defined in claim 1 where the amount of the europium activator in the barium aluminate phosphors is not larger than 0.2 gram atoms per one mol of the barium aluminate matrix.

32. A method as defined in claim 31 where the amount of the europium activator in the barium aluminate phosphors is within the range $10^{-6}$ to $5\times 10^{-3}$ gram atoms per one mol of the barium aluminate matrix.

33. Apparatus as defined in claim 12 wherein the amount of the europium activator in the barium aluminate phosphors is not larger than 0.2 gram atoms per one mol of the barium aluminate matrix.

34. Apparatus as defined in claim 33 where the amount of the europium activator in the barium aluminate phosphors is within the range of $10^{-6}$ to $5\times 10^{-3}$ gram atoms per one mol of the barium aluminate matrix.

35. A method as defined in claim 1 where the amount of the activator A' in the oxyhalide phosphors is within the range of $10^{-6}$ to $10^{-1}$ gram atoms per one mol of the Ln Ox matrix.

36. A method as defined in claim 1 where the amount of the activator A' in the oxyhalide phosphors is within the range of $10^{-6}$ to $5\times 10^{-3}$ gram atoms per one mol of the Ln OX matrix.

37. Apparatus as defined in claim 12 where the amount of the activator A' in the oxyhalide phosphors is within the range of $10^{-6}$ to $10^{-1}$ gram atoms per one mol of the LnOx matrix.

38. Apparatus as defined in claim 37 where the amount of the activator A' in the oxyhalide phosphors is within the range of $10^{-6}$ to $5\times 10^{-3}$ gram atoms per one mol of the LnOX matrix.

39. A method as in claim 1 where Ln is La.
40. A method as in claim 39 where X is Br.
41. Apparatus as in claim 12 where Ln is La.
42. Apparatus as in claim 41 where X is Br.

43. A method for recording and reproducing a radiation image comprising the steps of (i) causing a visible ray or infrared ray-stimulable phosphor to absorb a radiation passing through an object, (ii) stimulating said phosphor with stimulation rays selected from visible rays and infrared rays to release the energy of the radiation stored therein as fluorescent light, and (iii) detecting said fluorescent light characterized in that said phosphor is at least one phosphor selected from the group consisting of (a) a phosphor included in a group of europium activated barium aluminate phosphors represented by the formula

BaO.xAl$_2$O$_3$:Eu wherein x is a number satisfying the condition of $0.8 \leq x \leq 10$, and (b) a phosphor included in a group of oxyhalide phosphors represented by the formula

LnOX:zA' wherein Ln is at least one element selected from the group consisting of La, Y, Gd and Lu, X is Cl and/or Br, A' is Ce and/or Tb, and z is a number satisfying the condition of $0<z<0.1$, and that the wavelength of said stimulation rays is not less than 500 nm and wherein, when said barium aluminate phosphor is BaO-Al$_2$O$_3$:0.005 Eu, the sensitivity of the aforesaid phosphor is 150 times greater than that of SrS:0.0001 Eu, 0.001Sm when both of the foregoing phosphors are respectively exposed to X-rays of 80 KVp and then stimulated with a He-Ne laser beam, the stimulated emission being detected by a photomultiplier having a spectral sensitivity of S-5.

44. An apparatus for recording and reproducing a radiation image comprising (i) a radiation image storage panel comprising a visible ray- or infrared ray-stimulable phosphor which absorbs a radiation passing through an object, (ii) a light source emitting stimulation rays which stimulate said phosphor to release the energy of the radiation store therein as fluorescent light, and (iii) a detector for detecting said fluorescent light characterized in that said phosphor is at least one phosphor selected from the group consisting of (a) a phosphor included in a group of europium activated barium aluminate phosphors represented by the formula

BaO.xAl$_2$O$_3$:Eu wherein x is a number satisfying the condition of $0.8 \leq x \leq 10$, and (b) a phosphor included in a group of oxyhalide phosphors represented by the formula

LnOX:zA' wherein Ln is at least one element selected from the group consisting of La, Y, Gd and Lu, X is Cl and/or Br, A' is Ce and/or Tb, and z is a number satisfying the condition of $0<z<0.1$, and that the wavelength of said stimulation rays is not less than 500 nm and wherein, when said barium aluminate phosphor is BaO-Al$_2$O$_3$:0.005 Eu, the sensitivity of the aforesaid phosphor is 150 times greater than that of SrR:0.0001 Eu, 0.0001Sm when both of the foregoing phosphors are respectively exposed to X-rays of 80 KVp and then stimulated with a He-Ne laser beam, the stimulated emission being detected by a photomultiplier having a spectral sensitivity of S-5.

45. A method for recording and reproducing a radiation image comprising the steps of (i) causing a visible ray- or infrared ray-stimulable phosphor to absorb a radiation passing through an object, (ii) stimulating said phosphor with stimulation rays selected from visible rays and infrared rays to release the energy of the radiation stored therein as fluorescent light, and (iii) detecting said fluorescent light characterized in that said phosphor is at least one phosphor selected from the group consisting of (a) a phosphor included in a group of europium activated barium aluminate phosphors represented by the formula

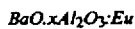
BaO.xAl$_2$O$_3$:Eu wherein x is a number satisfying the condition of $0.8 \leq x \leq 10$, and (b) a phosphor included in a group of oxyhalide phosphors represented by the formula

LnOX:zA' wherein Ln is at least one element selected from the group consisting of La, Y, Gd and Lu, X is Cl and/or Br, A' is Ce and/or Tb, and z is a number satisfying the condition of $0<z<0.1$, and that the wavelength of said stimulation rays is not less than 500 nm and wherein, when said oxyhalide phosphor is LaOBr:0.001 Tb, the sensitivity of the aforesaid phosphor is 700 times greater than that of a comparison phosphor SrS:0.0001 Eu, 0.0001Sm when both of the foregoing phosphors are respectively subjected to the operating conditions of exposing the phosphors to X-rays of 80 KVp and then stimulating them with a He-Ne laser beam, the stimulated emission being detected by a photomultiplier having a spectral sensitivity of S-5 or when the oxyhalide phosphor is LaOBr:0.0005 Ce, the sensitivity of the aforesaid phosphor is 500 times greater than that of the comparison phosphor under the said operating conditions or when the oxyhalide phosphor is LaOBr:0.0001Ce, 0.0001 Tb, the sensitivity of the last-mentioned phosphor is 700 times greater than that of the comparison phosphor under the said operating conditions or when the oxyhalide phosphor is LaOCl:0.0001 Ce, 0.0001 Tb, the sensitivity of the last-mentioned phosphor is 300 times that of the comparison phosphor under said operating conditions.

46. An apparatus for recording and reproducing a radiation image comprising (i) a radiation image storage panel comprising a visible ray- or infrared ray-stimulable phosphor which absorbs a radiation passing through an object, (ii) a light source emitting stimulation rays which stimulate said phosphor to release the energy of the radiation store therein as fluorescent light, and (iii) a detector for detecting said fluorescent light characterized in that said phosphor is at least one phosphor selected from the group consisting of (a) a phosphor included in a group of europium activated barium aluminate phosphors represented by the formula $$BaO.xAl_2O_y:Eu$$

wherein x is a number satisfying the condition of $0.8 \leq x \leq 10$, and (b) a phosphor included in a group of oxyhalide phosphors represented by the formula $$LnOX.zA'$$

wherein Ln is at least one element selected from the group consisting of La, Y, Gd and Lu, X is Cl and/or Br, A' is Ce and/or Tb, and z is a number satisfying the condition of $0 < z < 0.1$, and that the wavelength of said stimulation rays is not less than 500 nm and wherein, when said oxyhalide phosphor is LaOBr:0.001 Tb, the sensitivity of the aforesaid phosphor is 700 times greater than that of a comparison phosphor SrS:0.0001 Eu, 0.0001Sm when both of the foregoing phosphors are respectively subjected to the operating conditions of exposing the phosphors to X-rays of 80 KVp and then stimulating them with a He-Ne laser beam, the emission being detected by a photomultiplier having a spectral sensitivity of S-5 or when the oxyhalide phosphor is LaOBr:0.0005 Ce, the sensitivity of the aforesaid phosphor is 500 times greater than that of the comparison phosphor under the said operating conditions or when the oxyhalide phosphor is LaOBr:0.0001Ce, 0.0001 Tb, the sensitivity of the last-mentioned phosphor is 700 times greater than that of the comparison phosphor under the said operating conditions or when the oxyhalide phosphor is LaOCl:0.0001 Ce, 0.0001 Tb, the sensitivity of the last-mentioned phosphor is 300 times that of the comparison phosphor under said operating conditions.

* * * * *